Patented Dec. 18, 1945

2,391,004

UNITED STATES PATENT OFFICE 2,391,004

PROCESS FOR REFINING BUTADIENE CONTAMINATED WITH MONOVINYLACETYLENE

Frederick W. Breuer, Haverford, Pa., assignor to The United Gas Improvement Company, a corporation of Pennsylvania No Drawing. Application July 24, 1942, Serial No. 452,201

2 Claims. (Cl. 260—681.5)

This invention is concerned with the removal of impurities from butadiene and butadiene fractions.

More particularly, this invention pertains to the removal of certain impurities present in butadiene and butadiene fractions by means of selective hydrogenation, suitably in the presence of certain catalysts.

Butadiene may be obtained from several sources, such as by various synthetic methods, or by the pyrolysis of carbonaceous materials, such as alcohol and petroleum.

A particularly desirable method for the production of butadiene upon a commercial scale comprises the pyrolysis of petroleum oil, or fractions thereof, at temperatures substantially above 1100° F., and particularly above 1350° F., either in the presence or absence of catalysts, and at atmospheric or super-atmospheric pressures.

Methods involving the pyrolysis of butane and/or butenes also are well adapted to the production of butadiene upon a commercial scale, particularly when such methods are designed to be carried out in the presence of certain catalysts of sufficient activity to promote the removal of hydrogen atoms therefrom.

The butadiene and/or butadiene fractions obtained from the foregoing operations are well adapted to the production of synthetic rubber and/or other products by the polymerization or copolymerization thereof with other unsaturated compounds, except that the butadiene or butadiene fractions so obtained contain substantial quantities of impurities. As a result of an extensive investigation of the composition of such butadiene and butadiene fractions, I have found that the principal impurities present are acetylenic hydrocarbons. In particular, monovinyl acetylene appears to be present in all samples of butadiene prepared by the pyrolysis of petroleum or of petroleum fractions.

The removal of impurities, and particularly unsaturated impurities, from butadiene is a very difficult undertaking due to the pronounced activity of butadiene itself. Thus, the methods commonly employed in the industry for the refining of hydrocarbons, such as acid washing, clay contacting, and the like, cannot be employed for refining butadiene or butadiene fractions because of their pronounced polymerizing action, resulting in the loss of the greater portion, or all, of the butadiene present.

As a result of extensive experimentation, I have found that the acetylenic hydrocarbons, as well as certain other impurities, present in butadiene, and particularly light oil butadiene fractions, can be removed by means of selective hydrogenation in the presence of certain catalysts.

While many different types of catalysts may be employed for this purpose, I prefer to use an active iron catalyst.

A preferred method of preparing this catalyst comprises dissolving an iron-aluminum alloy in an alkaline solution, followed by washing to remove all impurities.

The invention may be more completely illustrated by means of the following example.

*Example*

A 46 gram portion of an iron-aluminum alloy containing 10% iron is added to 275 cc. of a sodium hydroxide solution containing 184 grams of NaOH in an ice-cooled flask at a rate sufficient to maintain the temperature of the reaction below 80° C., the time required being approximately 4½ hours. The mixture was heated on a water bath for a period of 2½ hours, after which a solution of 184 grams of sodium hydroxide in 275 cc. of water was added to insure complete reaction. The heating was continued for an additional period of 2½ hours, after which the mixture was divided into three equal parts, each of which was washed twice with 500 cc. each of freshly boiled water. The iron powder then was combined on a filter paper and washed until the filtrate was neutral to phenolphthalein. The catalyst then was washed with 95% ethanol and finally with absolute ethanol.

A butadiene fraction containing 80% butadiene, as well as several percent of acetylenes, was hydrogenated in the presence of this catalyst at a pressure ranging from 600 to 940 pounds per square inch and temperatures ranging from 23 to 110° C. The acetylenes present were completely removed, while the butadiene was practically unchanged in concentration.

Iron alloys containing varying quantities of aluminum, as well as other metals, may be employed in the production of the catalyst, which also can be prepared by other methods. Other selective catalysts also may be employed.

The temperature and pressure employed in the hydrogenation also may be varied over very wide limits, although temperatures at which substantial polymerization takes place should be avoided. The process also may be carried out in the liquid or the gaseous state.

For example, pressures between 20 and 150 atmospheres may be employed.

The butadiene or butadiene fractions which may be refined by this method may be obtained from any source, and may contain substantial quantities of materials other than the C₄ hydrocarbons, such as C₃ and/or C₅, or other, hydrocarbons and compounds, which also may contain acetylenes and/or other impurities.

The butadiene may have almost any desired concentration, such as from 5% to 99.5%.

While specific procedures have been described, it will be understood that these are given by way of illustration. Therefore, changes, omissions, substitutions, and/or modifications may be made within the scope of the claims without departing from the spirit of the invention.

I claim:

1. A process for refining butadiene in admixture with monovinylacetylene comprising subjecting said mixture to selective hydrogenation at a temperature from 23° C. to 110° C. and a pressure between 20 and 150 atmospheres in the presence of an active iron catalyst obtainable by treating an iron aluminum alloy with an alkaline solution to produce a residue of iron powder, and recovering said butadiene in a form less contaminated with monovinyl acetylene.

2. A process for refining a light oil butadiene fraction containing from 5% to 80% butadiene and containing impurity including monovinylacetylene comprising subjecting said light oil butadiene fraction to selective hydrogenation at a temperature from 23° C. to 110° C. and at a pressure between 20 and 150 atmospheres in the presence of an active iron catalyst obtainable by treating an iron aluminum alloy with an alkaline solution to produce a residue of iron powder, and recovering a light oil butadiene fraction of substantially the same butadiene concentration and less contaminated with monovinylacetylene.

FREDERICK W. BREUER.